(12) United States Patent
Elman et al.

(10) Patent No.: US 7,143,152 B1
(45) Date of Patent: Nov. 28, 2006

(54) GRAPHICAL USER INTERFACE AND METHOD FOR CUSTOMER CENTRIC NETWORK MANAGEMENT

(75) Inventors: Boris S. Elman, Newton, MA (US); David G. Kenneson, Acton, MA (US); Andrew Silletti, Norwood, MA (US)

(73) Assignees: Verizon Laboratories Inc., Waltham, MA (US); Level 3 Communications, Inc., Bloomfield, CO (US)

( * ) Notice: Subject to any disclaimer, the term of this patent is extended or adjusted under 35 U.S.C. 154(b) by 0 days.

(21) Appl. No.: 09/539,972

(22) Filed: Mar. 31, 2000

(51) Int. Cl.
*G06F 15/16* (2006.01)
*G06F 15/173* (2006.01)

(52) U.S. Cl. .................... 709/223; 709/219
(58) Field of Classification Search ........ 709/223–226, 709/227–229, 230, 217–219; 370/234, 254, 370/351; 345/733–750; 379/201–218; 715/730–737
See application file for complete search history.

(56) References Cited

U.S. PATENT DOCUMENTS

| | | | | |
|---|---|---|---|---|
| 5,805,166 A * | 9/1998 | Hall et al. | .................. | 715/839 |
| 5,864,666 A * | 1/1999 | Shrader | .................. | 726/15 |
| 5,910,803 A * | 6/1999 | Grau et al. | .................. | 715/734 |
| 5,926,463 A * | 7/1999 | Ahearn et al. | .................. | 370/254 |
| 5,959,985 A * | 9/1999 | Freen et al. | .................. | 370/351 |
| 6,009,475 A * | 12/1999 | Shrader | .................. | 709/249 |
| 6,031,528 A * | 2/2000 | Langfahl, Jr. | .................. | 715/734 |
| 6,040,834 A * | 3/2000 | Jain et al. | .................. | 709/223 |
| 6,163,544 A * | 12/2000 | Andersson et al. | .................. | 709/226 |
| 6,286,047 B1 * | 9/2001 | Ramanathan et al. | .................. | 709/224 |
| 6,297,823 B1 * | 10/2001 | Bharali et al. | .................. | 715/788 |
| 6,396,810 B1 * | 5/2002 | Hebel | .................. | 370/248 |
| 6,400,689 B1 * | 6/2002 | Sato et al. | .................. | 709/223 |
| 6,487,604 B1 * | 11/2002 | Rochford et al. | .................. | 709/238 |
| 6,512,824 B1 * | 1/2003 | Hsieh et al. | .................. | 379/230 |
| 6,532,241 B1 * | 3/2003 | Ferguson et al. | .................. | 709/223 |
| 6,549,940 B1 * | 4/2003 | Allen et al. | .................. | 709/219 |
| 6,570,867 B1 * | 5/2003 | Robinson et al. | .................. | 370/351 |
| 6,654,803 B1 * | 11/2003 | Rochford et al. | .................. | 709/224 |
| 6,694,362 B1 * | 2/2004 | Secor et al. | .................. | 709/223 |
| 6,714,217 B1 * | 3/2004 | Huang et al. | .................. | 715/736 |
| 6,763,380 B1 * | 7/2004 | Mayton et al. | .................. | 709/224 |
| 6,771,287 B1 * | 8/2004 | Walker et al. | .................. | 715/736 |

OTHER PUBLICATIONS

The Trustees of Dartmouth College Copyright © 1995-1996 *Intermapper 1.0 Tutorial* Internet Mapping and SNMP Monitoring for the Macintosh (Draft May 30, 1996).

* cited by examiner

*Primary Examiner*—David Wiley
*Assistant Examiner*—Joseph E. Avellino

(57) ABSTRACT

A graphical user interface and method for customer centric network management. The graphical user interface includes a first view showing text input by a user indicative of customer identification data corresponding to a customer in a network. This data is received by a server connected to the user. The server retrieves stored information corresponding to the customer identification data from a database and provides the stored information and actual circuit path information corresponding to a customer service based on the stored information to the graphical user interface. A second view of the graphical user interface shows the stored information, and a third view shows a graphical representation of a customer path corresponding to the actual circuit path information.

12 Claims, 8 Drawing Sheets

GRAPHICAL USER INTERFACE AND METHOD FOR CUSTOMER CENTRIC NETWORK MANAGEMENT

FIELD OF THE INVENTION

This invention relates to the general field of network management, and more particularly, to a system and method for using a graphical user interface for a customer centric view of a network for remote monitoring, testing, and configuration of network elements and customer services.

BACKGROUND OF THE INVENTION

With each passing year, the size and complexity of computer networks increases greatly. It is now common to have networks that link thousands or tens of thousands of devices. As networks get larger and more complex, network monitoring and network management becomes more complicated, and effective customer service management becomes more challenging.

Network management systems in networks that do not have that many linked devices are usually based on a display that shows all of the networked devices. For larger networks, however, using such a network management system is cumbersome. For example, a display that shows all of the devices in a network with ten thousand devices may take a long time to display and may be too complicated to easily understand.

One solution to the problems presented by large networks has been to use network management applications that provide views of the network/network elements by grouping. Grouping of network elements is either done manually or displayed automatically based on specific technology and/or span of control for a given element or network management application. Groups are also commonly formed based on the physical location of particular elements.

While grouping may simplify network management to a certain extent, customer service functions (e.g., customer reported trouble resolution, repair processes, advanced response desk functions, etc.) remain inefficient due to lack of being able to quickly focus on the possible problems being experienced by a specified customer using a specific service.

Accordingly, a need exists for a system and method for efficiently retrieving and managing network configuration, fault, and performance information for only those network elements which support a specified customer service based on customer service provisioning data and service level agreements.

SUMMARY OF THE INVENTION

A method consistent with the present invention provides for customer centric network management. The method includes the steps of: receiving customer identification data corresponding to a customer in a network; accessing a database for stored information corresponding to the customer identification data; and providing actual circuit path information corresponding to a customer service based on the stored information, wherein the actual circuit path information is used to generate a graphical representation of a customer path.

Another method consistent with the present invention provides for customer centric network management in a network. The method includes the steps of: populating a permanent database with network component information, the permanent database storing the network component information according to a generic information model; receiving customer identification data corresponding to a customer in the network; accessing the permanent database for network component information corresponding to the customer identification data; and providing actual circuit path information corresponding to a customer service based on the network component information, wherein the actual circuit path information is used to generate a graphical representation of a customer path.

Another method consistent with the present invention provides for customer centric network management. The method includes the steps of: receiving customer identification data corresponding to a customer in a network; accessing a database for stored information corresponding to the customer identification data; and providing actual circuit path information corresponding to a customer service based on the stored information, wherein the actual circuit path information is used to generate a graphical representation of heterogeneous network components supporting a specific service for the customer.

Another method consistent with the present invention provides for customer centric network management in a network. The method includes the steps of: populating a database with network component information, the database storing the network component information according to a generic information model; receiving customer identification data corresponding to a customer in the network; accessing the database for network component information corresponding to the customer identification data; and providing actual circuit path information corresponding to a customer service based on the network component information, wherein the actual circuit path information is used to generate a graphical representation of heterogeneous network components supporting a specific service for the customer.

An apparatus consistent with the present invention provides for a user interface for customer centric network management. The user interface includes: a first view showing text input by a user indicative of customer identification data corresponding to a customer in a network, wherein the customer identification data is received by a server connected to the user; a second view showing stored information corresponding to the customer identification data, wherein the server accesses a database to retrieve the stored information and provides actual circuit path information corresponding to a customer service based on the stored information to the user interface; and a third view showing a graphical representation of a customer path corresponding to the actual circuit path information.

Another apparatus consistent with the present invention provides for a user interface for customer centric network management. The user interface includes: a first view showing text input by a user indicative of customer identification data corresponding to a customer in a network, wherein the customer identification data is received by a server connected to the user; a second view showing stored information corresponding to the customer identification data, wherein the server accesses a database to retrieve the stored information and provides actual circuit path information corresponding to a customer service based on the stored information to the user interface; and a third view showing a graphical representation of heterogeneous network components supporting a specific service for the customer corresponding to the actual circuit path information.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The present invention relates to a graphical user interface and method for effectively retrieving and managing network configuration, fault, and performance information for only those network components supporting a specific service for a given customer. A user can view a graphical representation of a customer circuit path through heterogeneous network components, from customer premises equipment (CPE) to services, with the ability to drill down into information on inventory, network topology, status, performance, services, customer, etc. This view can be produced based on a customer or network related problem for a specific service used by the customer. Real time testing of individual network components and services provides a way to sectionalize faults and initiate most effective trouble resolution and repair processes.

Network Environment

Figure 1:
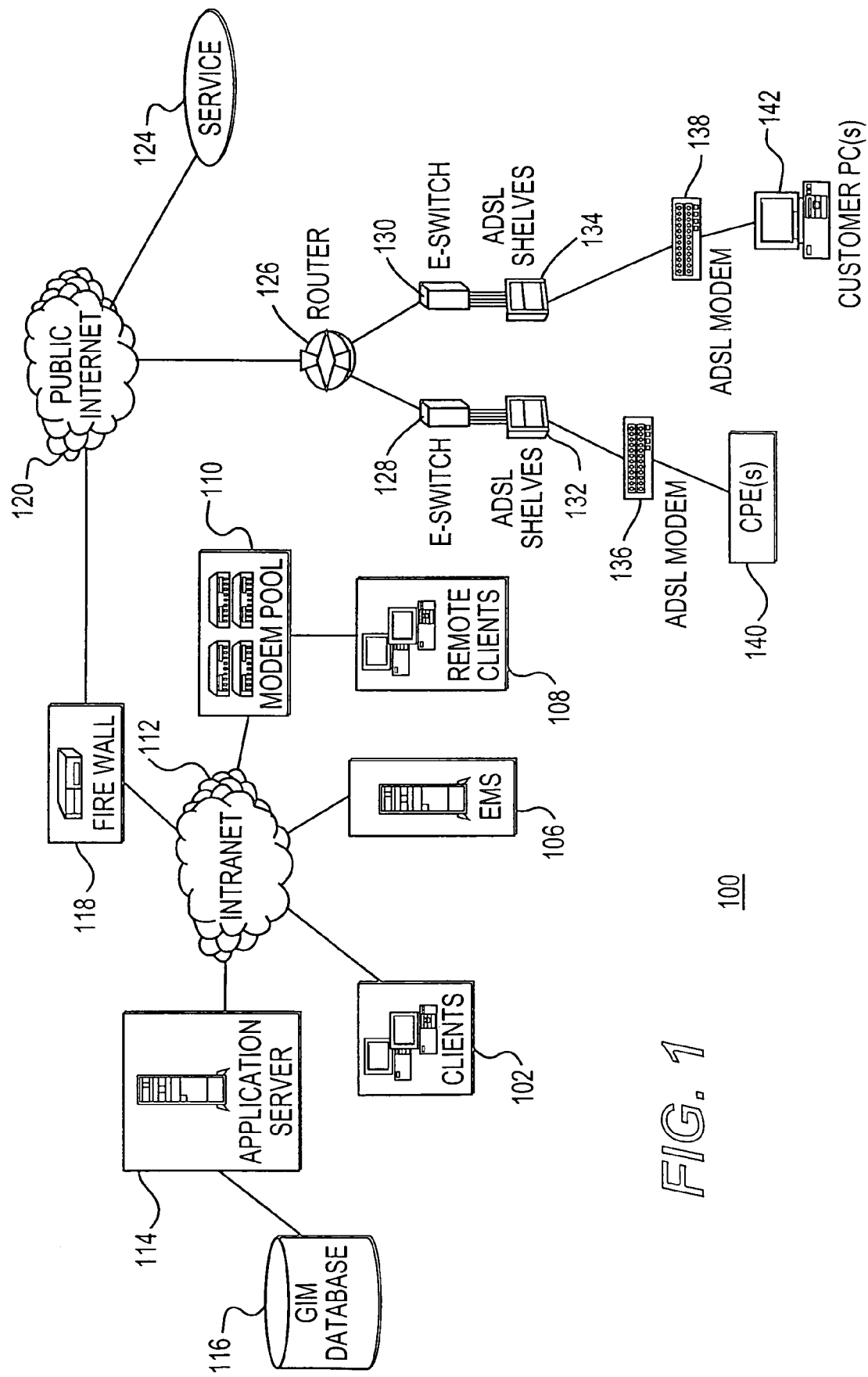
FIG. 1 is a diagram of an exemplary computer network environment in which the features and aspects of the present invention may be implemented.

FIG. 1 is a diagram of an exemplary network environment 100 in which the various features and aspects of the present invention may be implemented. Clients 102 host graphical user interface (GUI) engines and provide read/write access to generic information model (GIM) database 116 through Intranet 112 and application server(s) 114. GIM database 116 stores information on the various network components, customers, services, events, etc. The GUI engines resident on clients 102 provide a tool to effectively support customers by enabling network management for only the network components that are in the circuit path of a specified customer (e.g., network components supporting a specific service of the specified customer). These components may or may not be part of a heterogeneous network. In the context of FIG. 1, the components on the other side of firewall 118 (e.g., not on the same side as Intranet 112) are the managed components. Each customer on that side of firewall 118 uses service(s) each of which is supported by specific network components and has a specific CPE to services path. The functionality resident on clients 102 and information stored in GIM database 116 make it possible to graphically display the customer circuit paths and to support the specified customer by providing an easy to use interface for data entry and assignment of network information, and a variety of network and customer management functions, thereby allowing for the dynamic management of inventory, topology, capacity, and real time status of network resources. Clients 102 may also invoke various processes that are resident on application server 114 in order to properly provide customer support. In one embodiment, clients 102 may be workstation computers.

Remote clients 108 may also include the functionality resident on clients 102 that make it possible to provide for the customer centric network management of the present invention. For example, remote clients 108 may host a GUI engine similar to the one hosted by clients 102 that is needed to invoke the relevant management functions. Remote clients 108 utilize various ways to gain access to Intranet 112 (modem pool 110, for example) before network information can be sent to and received from GIM database 116 through the application server 114. In one embodiment, remote clients 108 may all be workstation computers.

Application server 114 is the access server for GIM database 116 and for the support functions used to populate and reconcile retrievable and non-retrievable network information in GIM database 116. Initially, information on the various components of the monitored network can be gathered either manually or automatically using one of the clients (102, 108) in the case of manual entry of non-retrievable information, or from clients 102, 108 or element management system (EMS) 106 in the case of automatic database population. Application server 114 uses this information to populate GIM database 116. Once GIM database 116 has been populated, application server 114 automatically ensures that the database accurately represents the network environment by running an update process. After database population, application server 114 may receive requests for access to information in GIM database 116 from one of the GUI engines resident on a client. In response to such a request, application server 114 may retrieve the desired information and send it to the appropriate client. Application server 114 also receives, processes, stores status and fault related messages from the monitored network, and provides basic testing/probing capabilities for the monitored network including Telnet sessions, Ping utility, SNMP utility tools for SNMP manageable network resources, etc. Application server 114 provides security and validation of user access privileges to the network components, EMS(s), etc. as well.

GIM database 116 stores the network information that is used to allow for customer centric network management. In one embodiment, GIM database 116 can be implemented with an Oracle database. GIM database 116 stores the network information according to a generic information model (GIM), which is a model that represents elements of all types of units (devices, connectors, etc.), in addition to information for various internet service providers, customers, statuses, locations, facilities, and so on, including the relationships among them. The relationship between this information may include, for example, the physical connectivity between ports, the logical separation of physical connections, and logical paths within a given device. The GIM acts like a generic interface for higher level functions such as interfaces to systems, GUI, services, etc. GIM allows GUIs to be designed to work with only one model so that no GUI software changes are required when new element types are introduced to the system. Rules or mappings are used to convert external information (e.g., management information bases [MIBs], screen dumps, etc.) into the model. As a result, applications can be built to one generic model while handling different network technologies and/or components of the same technology by different manufactures. For example, in the case of a customer centric view application, the application simply needs to find and connect network components to build and display a customer's network view, even when the network is built using different types of technologies such as ADSL (Asymmetric Digital Subscriber Line), Ethernet, SONET, etc.

The generic information model implemented in GIM database 116 is different from a common information model. A common information model only combines common information in the same format and non-common information in vendor specific formats. For example, SNMP MIB is a common information model where common information is presented in the form of standard MIBs and vendor specific information is presented in the form of enterprise MIBs. Thus, different methods are required to read card type and setting information about the same type of equipment from different vendors.

Application server 114 may include the full EMS functionality, thus not requiring a stand-alone EMS 106. Functionality of EMS 106, for example, assists application server 114 in the population of GIM database 116 by automatically acquiring retrievable information from the various components (e.g., network elements, services, devices, etc.) and passing it via Intranet 112 to application server 114. EMS 106 retrieves this information through Intranet 112 and firewall 118. EMS 106 also accesses the components periodically once GIM database 116 has been populated and provides information to application server 114 to keep the information in GIM database 116 current. EMS 106 may be utilized when an automatic population of GIM database 116 is desired. When manual entry of information is desired, EMS 106 is not used.

The network components and services that are being monitored so that a customer centric view can be generated may include, for example, public Internet 120, service 124, router 126, Ethernet switches (E-switch) 128 and 130, central office ADSL shelves 132 and 134, remote ADSL modems 136 and 138, customer premises equipment (CPE) 140, and customer PC 142. In one embodiment, service 124 may be an internet service provider (ISP) providing service to customers. Note that different technologies and configurations of network components and services could replace or be added to the configuration shown in FIG. 1. In other words, the exact arrangement, location, or type of components is irrelevant. Methods and systems consistent with the present invention acquire information from the various components and populate a database according to a generic information model regardless of factors such as type of technology, specific network component manufacturer, etc., so customer centric network management may be implemented.

Database Population and Update Process

Figure 2:
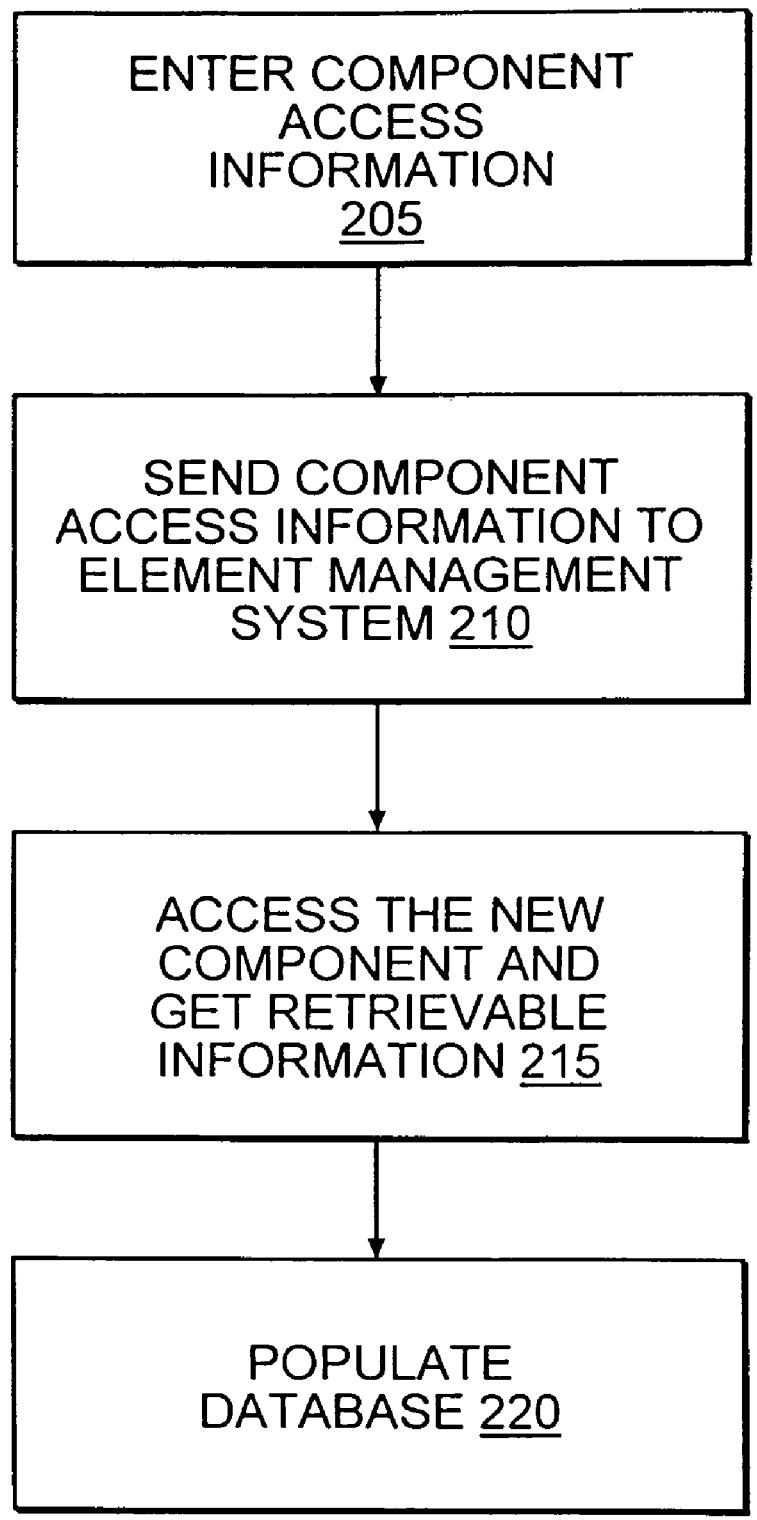
FIG. 2 is a flow chart of a process for populating a generic information model database consistent with the present invention.

FIG. 2 is a flowchart of an exemplary method for initially populating GIM database 116. An authorized user begins the process by entering component access information (step 205). For example, using the GUI engine resident on one of the clients, a user creates new objects for network components. This creation may occur by first adding EMS 106 or application server 114 to an access control list of the newly installed component. Next, the non-retrievable information (e.g., inventory access information, location, bay, shelf, etc.) for the component is entered. The new inventory access information is based on a specific communications protocol (e.g., internet protocol [IP], translation language 1 [TL1], etc.). Application server 114 receives all of this information from the GUI engine and notifies EMS 106 about the new component on the network by sending the relevant component access information to EMS 106 (step 210).

In response to receiving the device access information, EMS 106 stores the information, accesses the component (which is anywhere on the network accessible by EMS 106, including the public Internet side of firewall 118 and Intranet 112), and obtains desired retrievable information from the component (step 215). In one embodiment, retrievable information is information that corresponds to an active component. An example of an active component is a SNMP manageable network element that may contain a number of shelves. Shelves generally contain slots for cards that have ports. EMS 106 sends this retrievable information to application server 114. Once the retrievable information has been received, application server 114 may populate GIM database 116 with it (step 220). To ensure that GIM database 116 stays current, EMS 106 periodically accesses the components in the network, obtains retrievable information and provides it to application server 114 in a manner similar to that described above. At that point, application server 114 may invoke an update process, which is described below.

Figure 3:
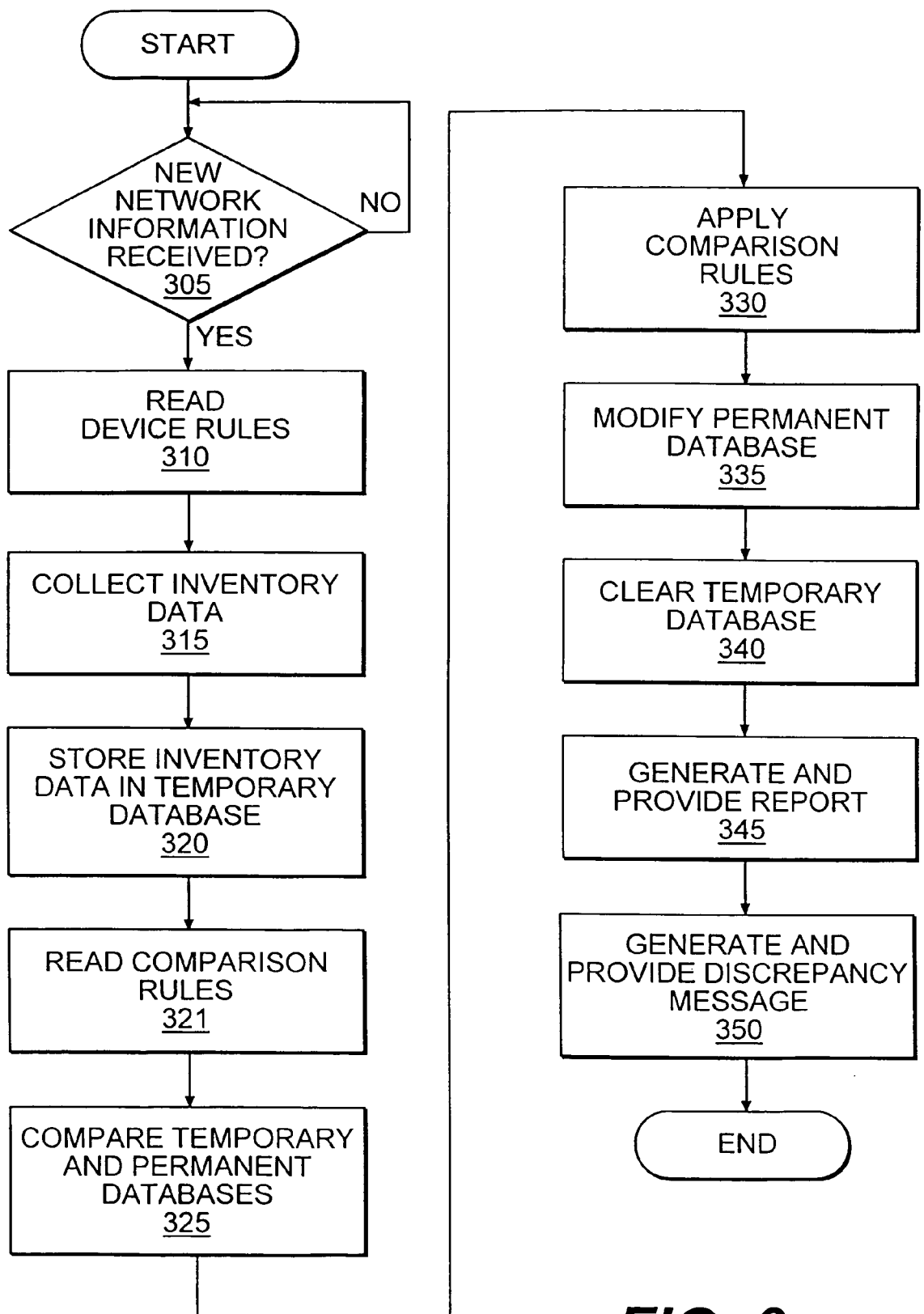
FIG. 3 is a flow chart of a process for updating a generic information model database consistent with the present invention.

FIG. 3 shows a flowchart that describes the update process. In one embodiment, this update process is performed by application server 114. Application server 114 invokes the update process based on both manual and automatic events. In both cases, application server 114 makes a request to an element management function or EMS 106 to access the components of the network so that retrievable information may be obtained and provided to application server 114. Network components refer to supervisory systems, devices, shelves, cards, ports, etc. Each network component has at least the following attributes associated with it: values (identity information); keys (relationship information); statuses (state information). Application server 114 is constantly monitoring EMS 106 and determining whether EMS 106 has sent it any new network information (step 305). If not, then operations continue as normal, and application server 114 continues the monitoring of EMS 106.

If application server 114 receives new network information from EMS 106, then the update process may be invoked. In one embodiment, the update process is performed by using a temporary database and a permanent database. While the present invention describes an update process using temporary and permanent databases, many modifications will be readily apparent that would achieve the same goal. The process begins by first reading various device rules that will be used in the update process (step 310). These rules help the update process decide exactly how to map network component information to GIM database 116. The process then collects the current inventory data from the network components (step 315). The inventory data referred to is the new network information that has been received from EMS 106. This inventory data is subsequently stored in GIM format in a temporary database created and maintained by application server 114 (step 320). After storage, application server 114 reads various comparison rules (step 321).

Data that has been stored in the temporary database needs to be compared to data in GIM database 116 (e.g., permanent database) so GIM database 116 can be reconciled with the temporary database (step 325). Reconciliation is done based on the comparison rules. These rules help the update process decide exactly how GIM database 116 should be modified. In one embodiment, the comparison of databases may occur by first querying both the temporary and permanent databases for specified portions of data. The results of these queries may be placed in respective caches. The caches are compared with each other, resulting in a series of conditions. One condition exists for each set of data that is compared. There may be four possible conditions that result from the comparison (same, changed, new, missing). The condition same refers to when the comparison of a specific temporary data element and its corresponding permanent data element have the same value. The condition changed refers to when corresponding temporary and permanent records have different values. The condition new refers to when a temporary record has been found that has no corresponding permanent record matching it. The condition missing refers to when the update process was unable to locate any temporary record that corresponds to an existing permanent record.

After the comparison of the caches has resulted in conditions, the comparison rules that were previously read are applied against the conditions (step 330). An example of a rule is as follows: any changes in a "device" found in the temporary data are used to update the same "device" in the permanent data. It follows that any number of rules may be created by an authorized user to influence the manner in which data is updated. The application of the rules gives rise to several actions which modify GIM database 116 (e.g., the permanent database) (step 335). For example, after execution of the comparison rule, application server 114 may need to insert data to, delete data from, or update the permanent GIM database 116 in different ways. Once the modification of the permanent GIM database 116 is complete, the temporary database can be cleared (step 340). A report detailing how GIM database 116 was modified is then generated by application server 114 and provided to the user (step 345).

Data which for some reason was not properly updated by the update process is determined by the update process and used as the basis of discrepancy messages that may be provided to an authorized user (step 350). These messages detail problems, errors, and other messages that require manual corrective intervention on the part of the user. In this manner, database reconciliation can be ensured.

Graphical User Interface

Figure 4:
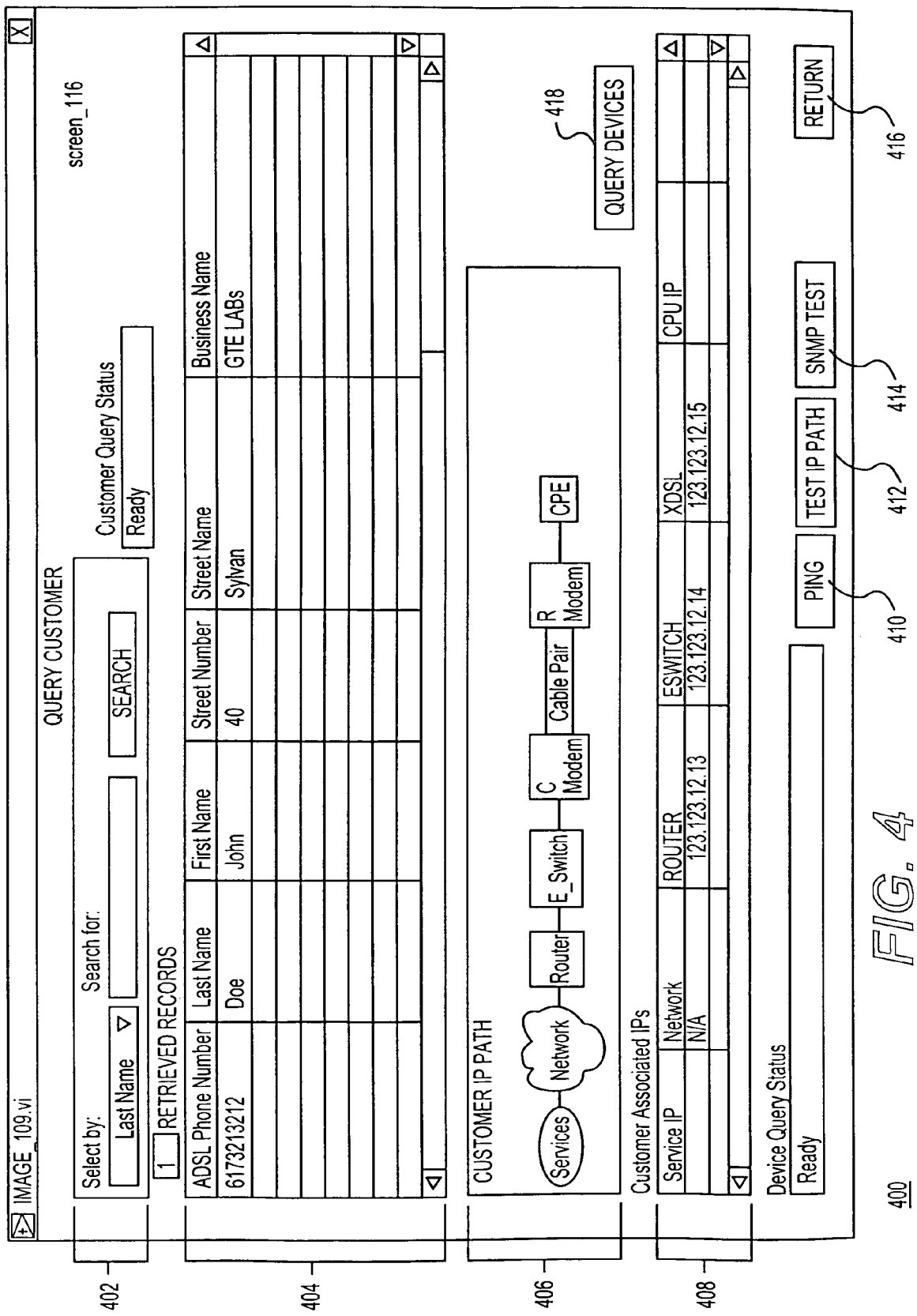
FIG. 4 is a first view of an exemplary graphical user interface consistent with one embodiment of the present invention.

FIG. 4 shows an example of a graphical user interface 400 consistent with the present invention. In one embodiment, graphical user interface 400 may be resident on one or more of the clients that are connected to intranet 112 (e.g., clients 102, remote clients 108). Graphical user interface 400 consists of several windows and buttons with which an authorized user may monitor/manage network components supporting a specific service for a given customer. Search window 402 can be used by a user to find a customer record. A user may enter a string to search for and select search criteria. For example, search criteria may be based on a customer's telephone number, last name, street address, IP address, business name, etc. The user may then click on the search button in search window 402 to cause a search of GIM database 116 for customer records that meet the search criteria. It is possible to have more than one customer record meet the search criteria (e.g., several customer with the same last name).

Results window 404 displays each of the customer records found in GIM database 116 as a result of the search. Because it is possible to have multiple records displayed, the user needs to select one of the records by highlighting that record. Results window 404 may have columns that coincide with the manner in which the records may be searched for (e.g., phone number column, last name column, etc.).

Customer circuit path window 406 graphically displays objects corresponding to network components supporting a specific service for a given customer from CPE to services. This information is graphically displayed by clicking Query Devices button 418. The displayed network components correspond to the way the network is provisioned to provide the specific service to the customer whose record was chosen by the user. Each customer record already has network components (e.g., customer's path) associated with it that were determined during the population and/or update of GIM database 116. Alternatively, the relevant network components can be determined as a result of the user selecting a customer record. In that case, a request may be sent to application server 114 asking for a customer path that corresponds to the specific service for that customer. Application server 114 would then find each of the components that support a specific service for the customer and build the path. The customer's path is then sent to the requester so that it may be displayed on graphical user interface 400.

Depending on a given customer's network configuration, the display may vary. The network components depicted in customer path window 406 are indicative of a path shown in FIG. 1. Specifically, CPE 140 corresponds to the CPE of the display, ADSL modem 136 corresponds to the R modem (remote modem), ADSL shelf 132 corresponds to the C modem (central office modem), E-Switch 128 corresponds to the E-Switch, router 126 corresponds to the router, public internet 120 corresponds to the Network, and service 124 corresponds to the Services. Customer associated IPs window 408 displays corresponding IP addresses for the components corresponding to the objects displayed in customer path window 406. More information can be retrieved on the components depicted in customer path window 406 by selecting one of the objects that correspond to the components and clicking on it. As a result, a window opens for each component selected. This window displays information such as status information for that given component as it relates to the customer.

In addition to displaying status information and the like, there are several buttons that may be used to initiate real time testing of the network components. Ping button 410 may be clicked by the user to invoke ping tool functions. Ping tool functions provide the capability to test access to a particular component from different probe locations. Test IP path button 412 may be clicked by the user to invoke testing of all customer associated IP/SNMP devices at once with three possible response levels: SNMP OK; DOWN; Ping Only. The MIB for a given device has to be accessible in order for the SNMP OK response to be obtained. SNMP test button 414 may be clicked by the user after selecting a specific device or IP address, to invoke SNMP querying of a specified device or IP address for SNMP system object information (e.g., information in window 506).

The combination of graphical displays, component information, and real time testing provided by graphical user interface 400 enable a user to sectionalize faults and initiate most effective trouble resolution and repair processes. Once a user has performed all of the functions that may be necessary to manage the customer's network, return button 416 may be clicked to go to a previous screen, where other network management functions may be performed.

Figure 5:
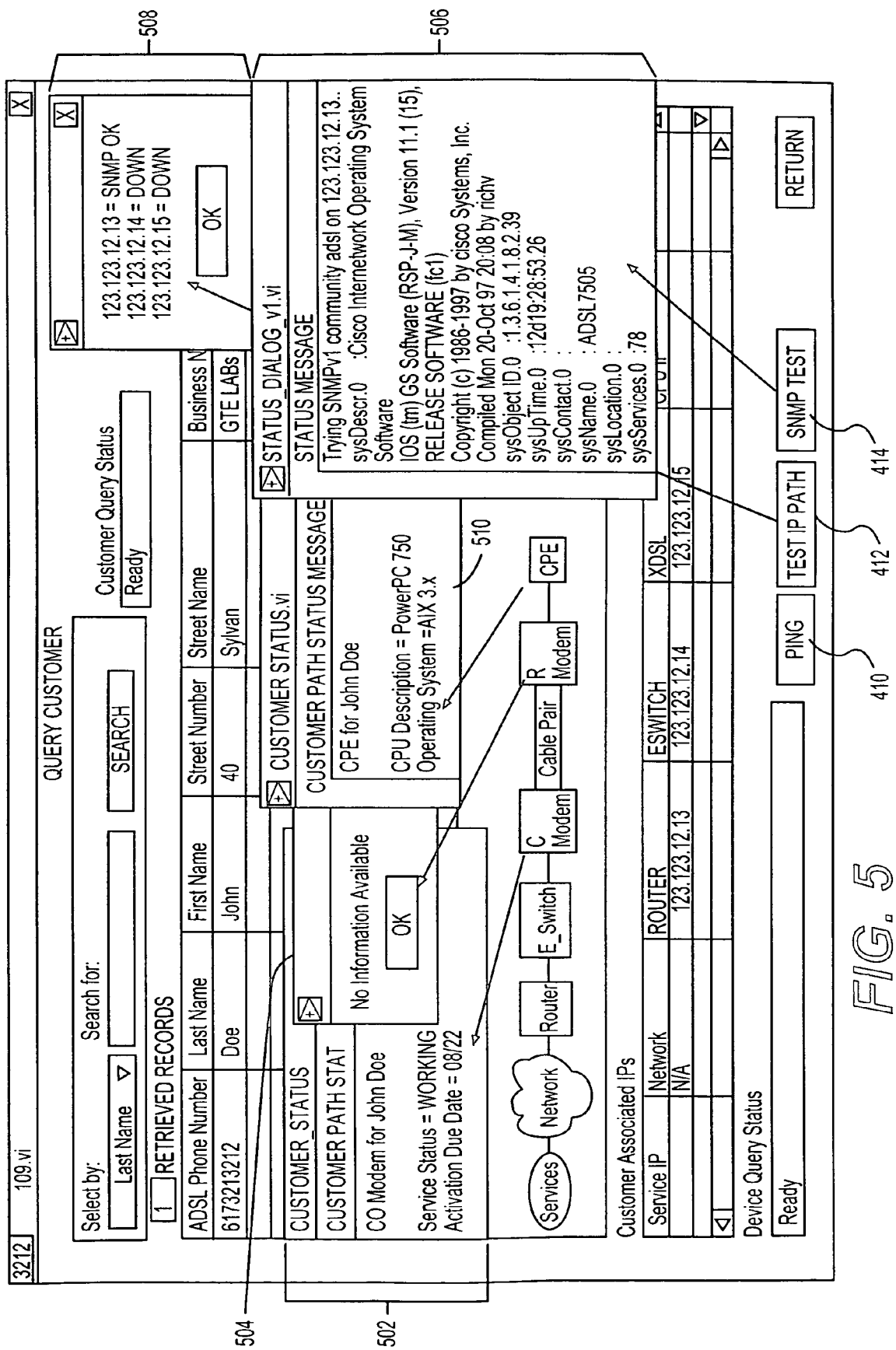
FIG. 5 is a second view of an exemplary graphical user interface consistent with one embodiment of the present invention.

FIG. 5 shows another view of graphical user interface 400. In this view, several windows depicting some of the various options available have been opened as examples of what may be done. Windows 502, 510 display status information for the C modem and CPE, respectively, which are parts of the customer path. Windows 502, 510 may be opened as a result of the user selecting a component in order to retrieve more information on it. The information included in windows 502, 510 may include information identifying the customer, information on the status of the component, information describing the component, etc. Window 504 shows an example of the window that appears when no information is available to be displayed in the case that a device can not be accessed or detailed information has not been populated into GIM database 116. Window 506 shows an example of a window that opens when a device or IP address to be tested is selected and the user clicks SNMP test button 414. As the SNMP test proceeds, the user is informed of the results. Window 508 shows an example of a window that opens when the user clicks Test Path button 412. Each IP address in window 508 corresponds to one of the components depicted in the customer path window. Each component, for example, may have three possible response levels for the test: SNMP OK, DOWN, and Ping Only. SNMP OK response means that SNMP access to the component is OK. DOWN response means that there is no SNMP or Ping access to the component. Ping Only response means that the component only responded to Ping and not to SNMP requests.

Figure 6:
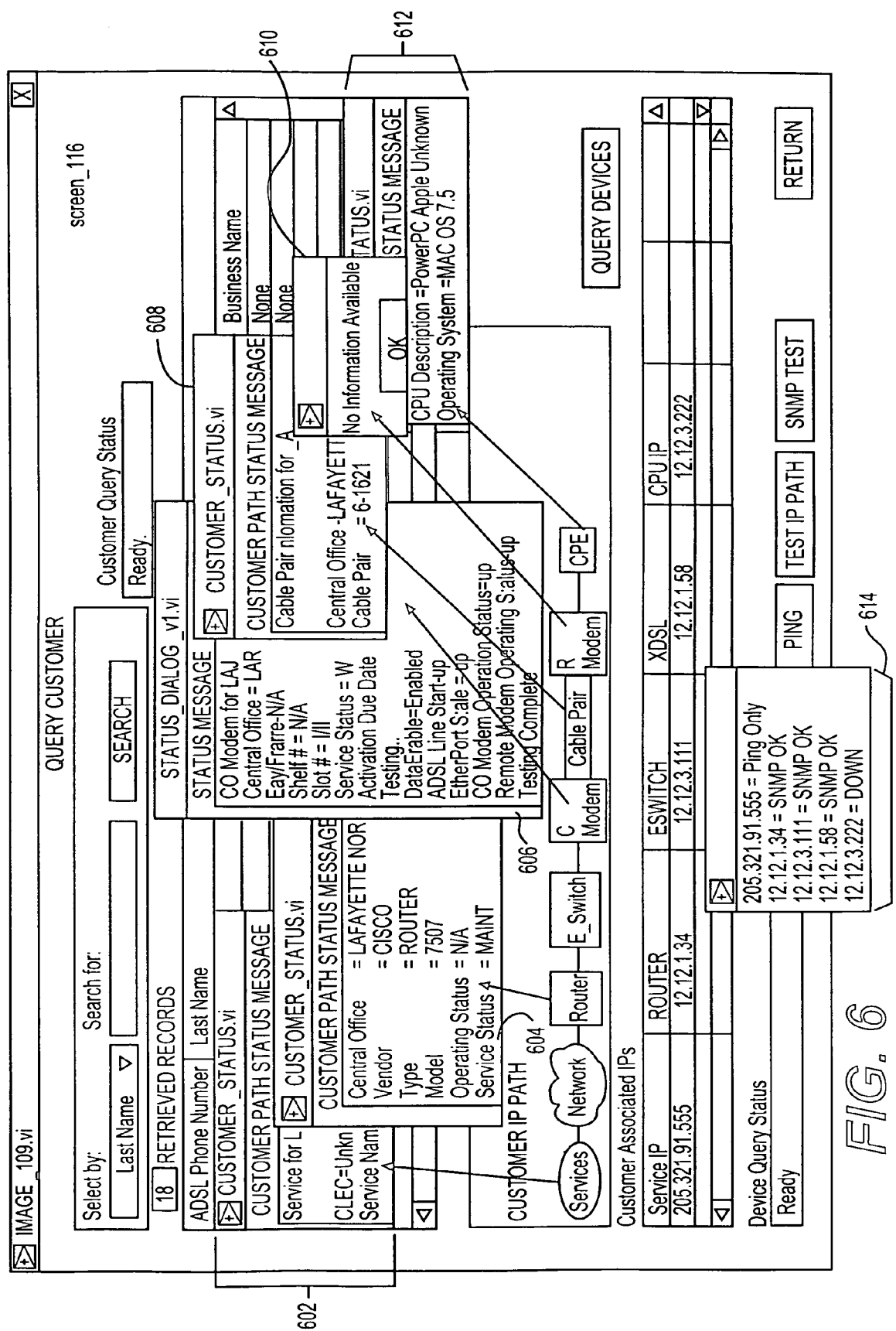
FIG. 6 is a third view of an exemplary graphical user interface consistent with one embodiment of the present invention.

FIG. 6 shows another view of graphical user interface 400. In this view, windows 602, 604, 606, 608, 610, 612 have been opened in order to display further information on services, router, C modem, cable pair, R modem, and CPE, respectively. Window 614 is the window that opens after the user clicks on the test path button.

Figure 7:
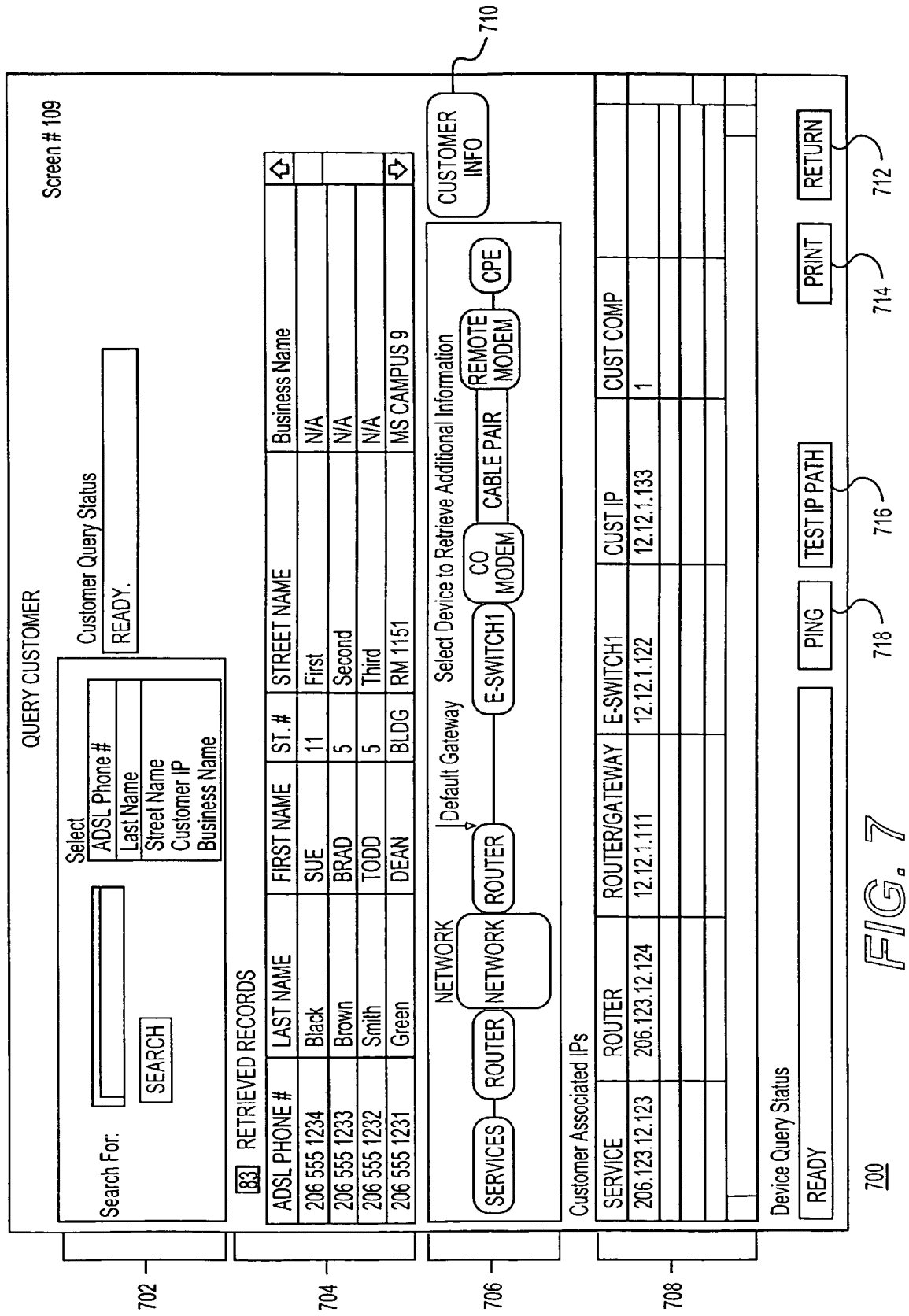
FIG. 7 is an exemplary graphical user interface consistent with another embodiment of the present invention.

FIG. 7 shows an alternative graphical user interface 700. Graphical user interface 700 performs essentially the same functions as graphical user interface 400. Specifically, search window 702, results window 704, customer path window 706, customer associated path window 708, ping button 718, test IP path button 716, and return button 712 operate in substantially the same manner as those corresponding windows and buttons in graphical user interface 400. One difference is customer info button 710. This button may be clicked by the user to access customer information such as customer remarks and customer contacts information. Another difference is print button 714, which may be clicked by the user at any time to print a screen dump.

Figure 8:
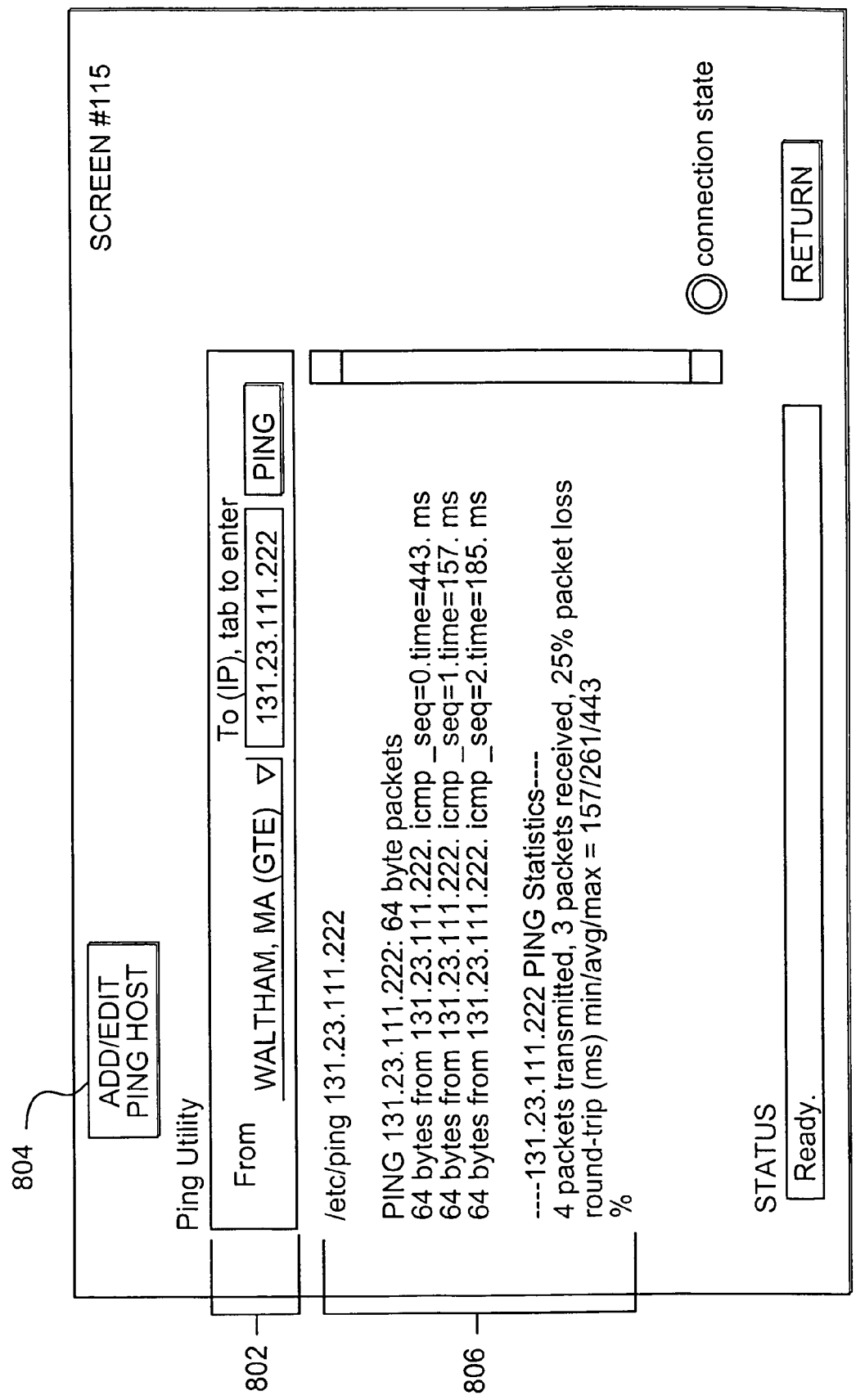
FIG. 8 is an exemplary window of a ping utility consistent with the present invention.

FIG. 8 shows an example of a ping tool window 800 that opens when the user clicks on ping button 410 or 718. The ping tool function provides the capability to test access to a particular component from different ping probe locations. The test can be initiated from different hosts in the network by selecting the host from a pull down list that is part of selection window 802. Selection window 802 is also utilized by the user to enter the IP address of the component that is to be tested. Add/Edit ping host button 804 may be clicked by the user to add, delete, or edit a host from the list of hosts that constitute the pull down list of selection window 802. Section 806 consists of messages indicative of the progress of the ping test. Note that the ping parameters may be adjustable.

While the present invention has been described in connection with a preferred embodiment, many modifications will be readily apparent to those skilled in the art, and this application is intended to cover any adaptations or variations thereof. This invention should be limited only by the claims and equivalents thereof.

What is claimed is:

1. A method for customer centric network management comprising the steps, performed by a processor, of:

receiving component access information for accessing at least one component in a network;

collecting new network component information from the at least one component based on the component access information;

storing the new network component information in a temporary database;

comparing the temporary database with a generic information model database;

modifying the generic information model database according to comparison rules;

receiving identification data corresponding to a customer in a network, wherein the customer is an entity of a type selected from the group consisting of a natural person, a company, an organization, and an enterprise;

accessing the generic information model database for one or more customer records corresponding to the customer identification data;

receiving selection information identifying a selected one of the one or more customer records, wherein the selected customer record corresponds to the customer; and providing actual circuit path information corresponding to a customer service based on the selected customer record, wherein the selected customer record contains the actual circuit path information having heterogeneous network components associated with the selected customer record and the heterogeneous network components support a specific service for the customer, and wherein the actual circuit path information is used to generate a graphical representation of the heterogeneous network components spanning the customer and the specific service.

2. The method of claim 1, further comprising:

sending the component access information to the element management system, the element management system retrieving network component information from at least one component in the network;

receiving the network component information from the element management system; and storing the network component information in the generic information model database.

3. A method for customer centric network management in a network comprising the steps, performed by a processor, of:

receiving component access information for accessing at least one component in a network;

populating a permanent database with network component information, the permanent database storing the network component information according to a generic information model;

receiving customer identification data corresponding to a customer in the network, wherein the customer is an entity of a type selected from the group consisting of a natural person, a company, an organization, and an enterprise;

accessing the permanent database for one or more customer records corresponding to the customer identification data;

receiving selection information identifying a selected one of the one or more customer records, wherein the selected customer record corresponds to the customer;

collecting new network component information from the at least one component based on the component access information;

storing the new network component information in a temporary database;

comparing the temporary database with the permanent database;

modifying the permanent database according to comparison rules; and providing actual circuit path information corresponding to a customer service based on the selected customer record, wherein the selected customer records contains the actual circuit path information having heterogeneous network components associated with the customer record and the heterogeneous network components support a specific service for the customer, and wherein the actual circuit path information is used to generate a graphical representation of the heterogeneous network components spanning the customer and the specific service.

4. The method of claim 3, said populating step further comprising:

sending the component access information to an element management system, the element management system retrieving network component information from at least one component in the network;

receiving the network component information from the element management system; and storing the network component information in the permanent database.

5. The method of claim 3, further comprising:

modifying the permanent database based on an automatic event.

6. The method of claim 3, further comprising:

modifying the permanent database based on a manual event.

7. A method for customer centric network management comprising the steps, performed by a processor, of:

receiving component access information for accessing at least one component in a network;

collecting new network component information from the at least one component based on the component access information;

storing the new network component information in a temporary database;

comparing the temporary database with a generic information model database;

modifying the generic information model database according to comparison rules;

receiving identification data corresponding to a customer in a network, wherein the customer is an entity of a type selected from the group consisting of a natural person, a company, an organization, and an enterprise;

accessing the generic information model database for one or more customer records corresponding to the customer identification data;

receiving selection information identifying a selected one of the one or more customer records, wherein the selected customer record corresponds to the customer; and providing actual circuit path information corresponding to a customer service based on the selected customer record, wherein the selected customer record contains the actual circuit path information having network components associated with the selected customer record and the network components support a specific service for the customer, and wherein the actual circuit path information is used to generate a graphical representation of a customer path spanning the customer and the specific service.

8. The method of claim 7, further comprising;

sending the component access information to the element management system, the element management system retrieving network component information from at least one component in the network;

receiving the network component information from the element management system; and storing the network component information in the generic information model database.

9. A method for customer centric network management in a network comprising the steps, performed by a processor, of:

receiving component access information for accessing at least one component in a network;

populating a generic information model database with network component information, the database storing the network component information according to a generic information model;

collecting new network component information from the at least one component based on the component access information;

storing the new network component information in a temporary database;

comparing the temporary database with the permanent database;

modifying the permanent database according to comparison rules;

receiving customer identification data corresponding to a customer in the network, wherein the customer is an entity of a type selected from the group consisting of a natural person, a company, an organization, and an enterprise;

accessing the database for one or more customer records corresponding to the customer identification data;

receiving selection information identifying a selected one of the one or more customer records, wherein the selected customer record corresponds to the customer; and providing actual circuit path information corresponding to a customer service based on the selected customer record, wherein the selected customer record contains the actual circuit path information having network components associated with the selected customer record and the network components support a specific service for the customer, and wherein the actual circuit path information is used to generate a graphical representation of a customer path spanning the customer and the specific service.

10. The method of claim 9, said populating step further comprising:

sending the component access information to an element management system, the element management system retrieving network component information from at least one component in the network;

receiving the network component information from the element management system; and storing the network component information in the permanent database.

11. The method of claim 9, further comprising;

modifying the permanent database based on an automatic event.

12. The method of claim 9, further comprising:

modifying the permanent database based on a manual event.

* * * * *